Oct. 3, 1950 J. MATTEI 2,524,731
MIRROR PROTECTOR
Filed Sept. 27, 1946 2 Sheets-Sheet 1
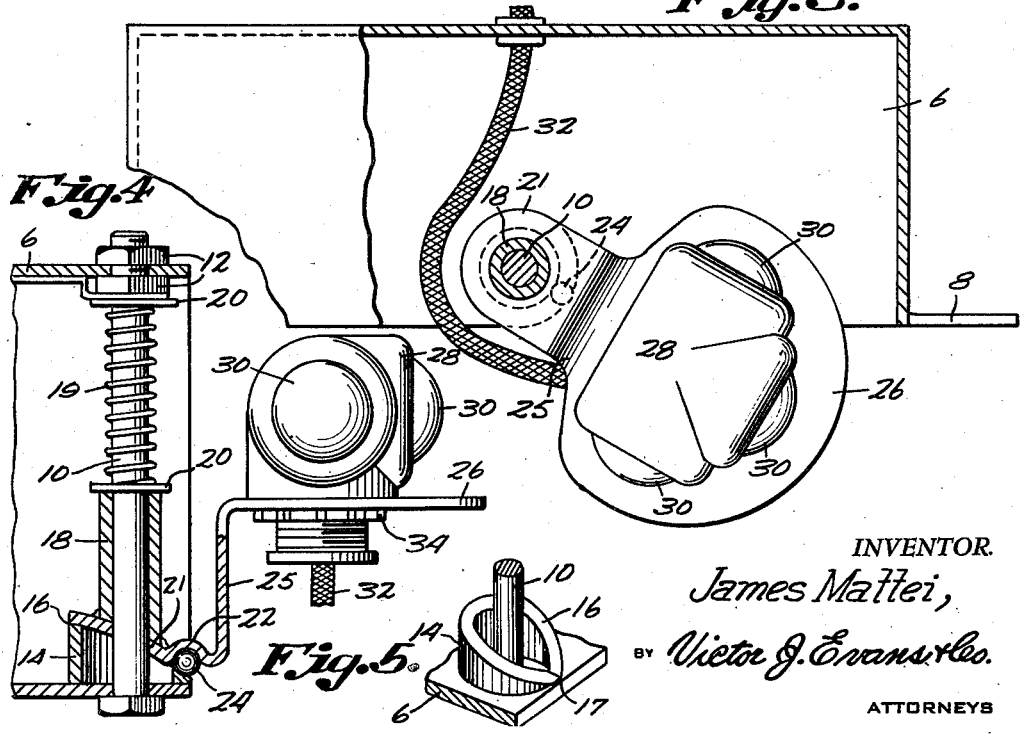
INVENTOR.
James Mattei,
BY Victor J. Evans & Co.
ATTORNEYS

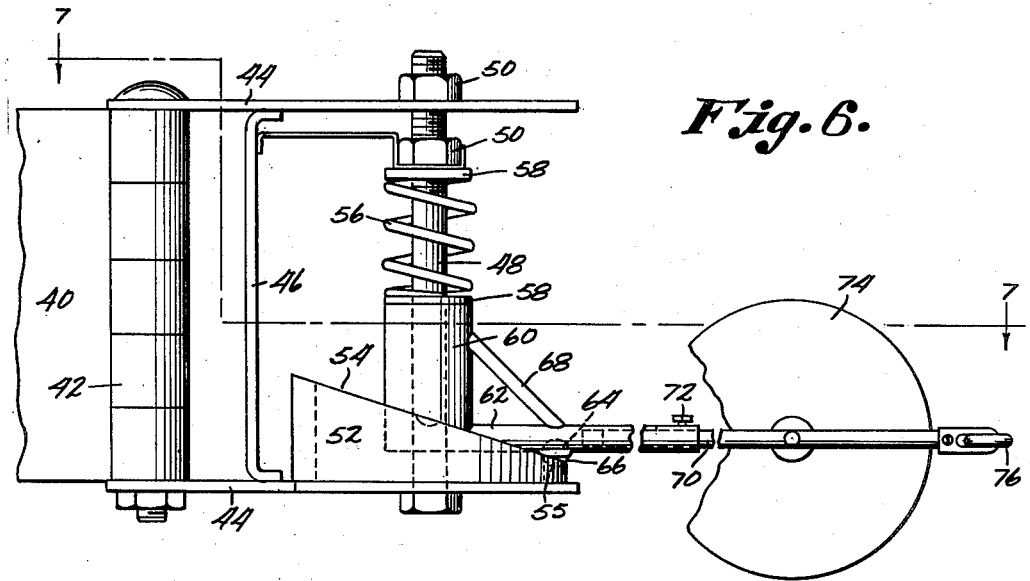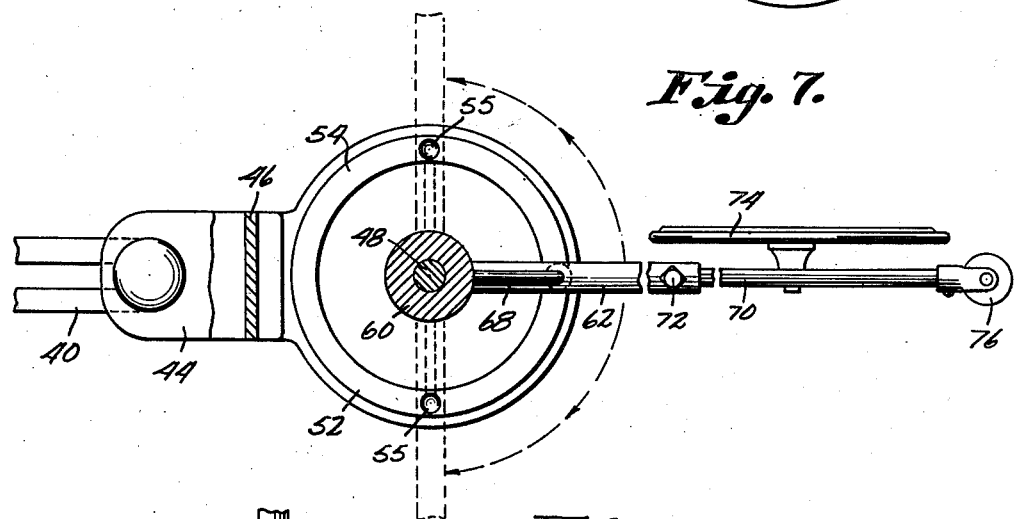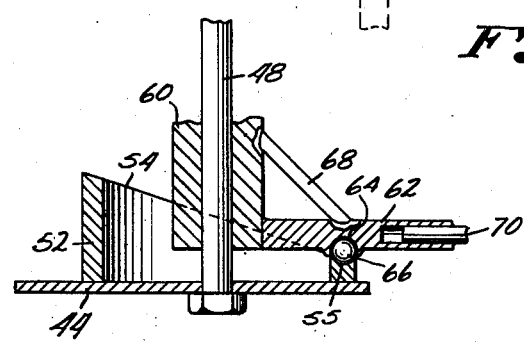

Patented Oct. 3, 1950

2,524,731

UNITED STATES PATENT OFFICE 2,524,731

MIRROR PROTECTOR

James Mattei, Myrtle Point, Oreg.

Application September 27, 1946, Serial No. 699,832

3 Claims. (Cl. 248—282)

My present invention relates to an improved mirror and lamp support of the type especially adapted for use on large trucks of substantial width which are required for safety purposes to carry on the truck and trailer, lamps indicating the width of the vehicle and a mirror to enable the driver to see to the rear. At the present time however, inasmuch as these lamps and the mirror must of necessity protrude outside the vertical planes of the vehicle, the lamps and the mirrors are frequently damaged or broken by contact with a stationary object as when the vehicle passes with too little clearance, or when the trailer is parked close to a loading platform.

It is therefore my purpose to present a means of supporting these lamps and the mirrors so that when either strikes a stationary object, the lamp or mirror will swivel offering no resistance and preventing damage and breakage and the attendant repair or replacement cost.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a top plan view of a trailer truck embodying the device of my invention.

Figure 2 is a front elevational view of the swiveled light.

Figure 3 is a top plan view thereof.

Figure 4 is a side elevational view.

Figure 5 is a perspective view of the cam track for the light.

Figure 6 is an elevational view of a swiveled mirror.

Figure 7 is a horizontal sectional view at line 7—7 of Figure 6.

Figure 8 is a detail view of the swivel device for the mirror.

Referring now to the drawings wherein like characters indicate like parts, I have illustrated the structure of my invention as embodying for use with a truck 2 and a trailer 4, the open box 6 which may be suitably mounted at the desired places on the trailer by means of the ears 8.

Extending vertically between the top and bottom of the open box 6 I have employed a bolt axle 10 secured by nuts 12 and a collar 14 is positioned about the bolt axle and is formed with a cam edge 16 having a low point 17.

A tubular bearing 18 is mounted on the axle and is urged downwardly by the spring 19 confined by washers 20 and on the base of this tubular bearing I have provided an angularly disposed flange 21 having a depression therein 22 for the ball 24. A vertical leg 25 extends from the flange and carries the rounded protecting abutment 26 upon which is mounted the lamp casing 28, having lenses 30. The wire 32 provides a source of electricity to the bulb in the casing, not shown, and the casing is secured to the abutment by means of lock nut 34.

The force of the spring together with the weight of the lamp supporting elements normally maintain the lamp in extended position with the ball 24 seated at the low point of the cam edge. However, should the abutment 26 strike an object as the truck moves, the lamp supporting structure will pivot on the cam edge of the collar 14, the bearing rising against the tension of the spring on the axle bolt. When the stationary object is passed, the lamp supporting structure will return to normal position as the spring and the weight swing the tubular bearing and its flange to the position indicated in Figure 4 of the drawings.

In Figures 6 through 8 I have illustrated the supporting swivel of my invention as applied to a mirror for a truck and in this embodiment I employ a bracket 40 having a hinge 42 from which extend the arms 44 carrying the frame 46.

In this construction I utilize an axle bolt 48 secured by nuts 50 and having a collar 52 formed with a cam edge 54 and spaced notches 55 in the cam edge.

A spring 56 positioned by washers 58 on the axle bolt urges the bearing 60 downward and this bearing carries the supporting arm 62 which is provided with a notch 64 for the ball bearing 66 which rides on the cam edge and engages one of the spaced notches thereon to releasably retain the supporting arm in a determined position.

The supporting arm is braced as at 68 and carries the mirror arm telescoped within the support arm and secured by adjustment screw 72. The mirror 74 is suitably attached to the mirror arm and in the end of the latter arm I employ a roller 76 which will ride along the surface of an object in the path of the mirror.

As in the case of the swiveled lamp, the mirror arm being of course forward of the mirror will when struck by an object in its path, swivel on the bolt axle, the ball 66 being removed from the lower notch on the cam edge and the ball riding up the cam edge in either direction until the ball engages another notch whereupon the mirror will be retained in swiveled position until released by the operator.

From the above description of the structure and operation of the device of my invention it will be apparent that the swiveling of the lamp and mirror will be automatic upon contact of either with an object in the path of movement, and that the swiveling will avoid damage and breakage to either the lamp or mirror and will effect a protection thereof with a resulting saving in repairs or replacements, and the attendant violation of the law in operating a truck without the proper lamps and mirror.

Having thus fully described my invention, what I claim as new and desire to secure by Letters Patent is:

1. A mirror and lamp support for a vehicle, comprising an open box-like frame, a supporting axle mounted in said frame, a lamp and mirror supporting arm pivotally mounted upon said axle, yieldable means for normally holding said arm outwardly of said frame, means for receiving said arm in said frame upon the application of force thereto and automatic means for returning said arm to normal position.

2. A mirror and lamp support for a vehicle, comprising a box-like frame, a supporting axle mounted in said frame, a lamp and mirror supporting arm pivotally mounted upon said axle, yieldable means for normally holding said arm outwardly of said frame, means for receiving said arm in said frame upon the application of force thereto and automatic means for returning said arm to normal position, said yieldable means comprising a cam affixed in said frame and having its lowest point adjacent the outer edge of the frame, a cam associated with the arm and adapted to rest upon the fixed cam and a spring adapted to urge the cams together.

3. A device as defined in claim 1 wherein the cutter end of the arm is provided with a horizontally revoluble roller.

JAMES MATTEI.

REFERENCES CITED

The following references are of record in the file of this patent:

UNITED STATES PATENTS

| Number | Name | Date |
|---|---|---|
| 1,386,621 | Hughes | Aug. 9, 1921 |
| 1,435,110 | Efford | Nov. 7, 1922 |
| 2,145,782 | Townsend | Jan. 31, 1939 |
| 2,220,468 | Vasseur | Nov. 5, 1940 |